United States Patent [19]
Fujisawa et al.

[11] Patent Number: 5,310,606
[45] Date of Patent: May 10, 1994

[54] SLIDE MEMBER

[75] Inventors: Yoshikazu Fujisawa; Takeshi Narishige; Yuzuru Miyazaki, all of Saitama, Japan

[73] Assignee: Honda Giken Kogyo Kabushiki Kaisha, Tokyo, Japan

[21] Appl. No.: 989,733

[22] Filed: Dec. 10, 1992

Related U.S. Application Data

[63] Continuation of Ser. No. 642,812, Jan. 18, 1991, abandoned.

[30] Foreign Application Priority Data

Jan. 19, 1990 [JP] Japan .................................. 2-10119
Jan. 19, 1990 [JP] Japan .................................. 2-10120
Jan. 19, 1990 [JP] Japan .................................. 2-10121

[51] Int. Cl.$^5$ .................................................. F16C 33/12
[52] U.S. Cl. .................................. 428/645; 428/687; 428/935; 384/912
[58] Field of Search ............ 428/643, 644, 645, 687, 428/935; 384/912, 913, 625

[56] References Cited

U.S. PATENT DOCUMENTS

| | | | |
|---|---|---|---|
| 2,586,099 | 2/1952 | Schultz | 428/645 |
| 2,741,016 | 4/1956 | Roach | 428/645 |
| 4,470,184 | 9/1984 | Fukuoka et al. | 384/913 |
| 4,528,079 | 7/1985 | Badger | 354/293 |
| 4,832,801 | 5/1989 | Mori | 204/44.4 |
| 4,900,639 | 2/1990 | Hodes et al. | 428/610 |
| 4,937,149 | 6/1990 | Mori | 428/645 |

FOREIGN PATENT DOCUMENTS

| | | | |
|---|---|---|---|
| 366418 | 4/1982 | Austria . | |
| 0218772 | 10/1985 | European Pat. Off. . | |
| 52-35775 | 3/1977 | Japan . | |
| WO89/1094 | 2/1989 | PCT Int'l Appl. | 384/912 |
| 750557 | 6/1956 | United Kingdom . | |
| 1295997 | 11/1972 | United Kingdom . | |
| 2060692 | 5/1981 | United Kingdom . | |
| 208491A | 4/1982 | United Kingdom | 204/44.4 |
| 2084609 | 4/1982 | United Kingdom . | |
| 2117403 | 10/1983 | United Kingdom . | |

OTHER PUBLICATIONS

G. Roventi, R. Fratesi, "Electro Deposition of Lead Alloys from Fluoborate Baths", Journal of Applied Electrochemistry 14, (1984), pp. 505–510.

J. Azzolino, "Lead–Tin Alloy Plating for Aircraft Engine Components", Plating, Nov. 1957, pp. 130–132.

G. B. Rynne, "New Dimension in Tin–Lead Plating", Plating, Sep. 1971, vol. 58, No. 9, pp. 867, 899, 72, 74, 76.

*Primary Examiner*—John Zimmerman
*Attorney, Agent, or Firm*—Lyon & Lyon

[57] ABSTRACT

A slide member includes a surface layer of a Pb alloy on a slide surface for a mating member, and the crystal form of the Pb alloy is formed such that the orientation index in a (h00) plane by Miller indices is in a range of 50 to 100%.

23 Claims, 10 Drawing Sheets

SLIDE MEMBER

This is a continuation of co-pending application Ser. No. 07/642,812 filed Jan. 18, 1991 now abandoned.

BACKGROUND OF THE INVENTION

1. Field of the Invention

The field of the present invention is slide members and more particularly, improvement in slide members of the type having a surface layer of a Pb alloy on a slide surface for a mating member.

2. Description of the Prior Art.

There are conventionally known slide bearings as a slide member of such type, comprising a surface layer formed of a Pb-Sn based alloy (see Japanese patent Application Laid-open No. 96088/81).

Such a slide bearing has been applied to a journal portion of a crankshaft in an engine, an enlarged end of a connecting rod, or the like. Under existing circumstances where there is a tendency of increasing in speed and output of an engine, however, the prior art slide members suffer from a problem that they merely show a poor seizure resistance at the surface layer thereof. This is primarily due to the crystal form of Pb-Sn based alloy forming the surface layer; the crystal form being a form with crystal faces oriented at random. In addition, from a viewpoint of improvement in seizure resistance, it is necessary to improve the oil retension characteristic of the surface layer.

SUMMARY OF THE INVENTION

It is an object of the present invention to provide a slide member of the type described above, wherein the seizure resistance of the surface layer can be increased by specifying the crystal form of a Pb alloy.

It is another object of the present invention to provide a slide member of the type described above, wherein the oil retension characteristic of the surface layer can be improved by specifying the form, geometric shape and size of the crystal of a Pb alloy, thereby increasing the seizure resistance of the surface layer.

It is a further object of the present invention to provide a slide member of the type described above, wherein the seizure resistance of the surface layer can be increased by specifying the amount of Sn incorporated based on Pb and specifying the crystal form of a Pb alloy.

To achieve the above objects, according to the present invention, there is provided a slide member comprising a surface layer of a Pb alloy on a slide surface for a mating member, wherein the crystal form of the Pb alloy is formed, so that the orientation index in a (h00) plane by Miller indices is in a range of 50 to 100%.

If the orientation index in the (h00) plane is set in the above-described range, the seizure resistance of the surface layer can be increased. However, if the orientation index is lower than 50%, a satisfactory seizure resistance is not obtained.

In addition, according to the present invention, there is provided a slide member comprising a surface layer of a Pb alloy on a slide surface for a mating member, wherein the crystal form of the Pb alloy is formed, so that the orientation index in a (h00) plane by Miller indices is in a range of 50 to 100%, and wherein the crystal of the Pb alloy is formed into a pyramid shape with its apex directed to the slide surface and having a base length of 8 $\mu$m or less.

If the form, geometric shape and size of the crystal of the Pb alloy forming the slide surface of the surface layer are specified as described above, the oil retension characteristic of the surface layer can be improved, thereby providing an increased seizure resistance.

However, if the base length d of the pyramid exceeds 8 $\mu$m, the oil retension characteristic of the surface layer is degraded, resulting in a reduced seizure resistance.

Further, according the present invention, there is provided a slide member wherein the Pb alloy contains 3% (inclusive) to 20% (inclusive) by weight of Sn.

If the Sn content and the crystal form in the Pb alloy are specified as described above, the seizure resistance of the surface layer can be increased, and the surface layer can be provided with a fatigue resistance.

However, if the Sn content is less than 3% by weight, the fatigue resistance of the surface layer is reduced. If the Sn content exceeds 20% by weight, the seizure resistance of the surface layer is reduced.

The above and other objects, features and advantages of the invention will become apparent from reading of the following description of the preferred embodiments, taken in conjunction with the accompanying drawings.

DESCRIPTION OF THE PREFERRED EMBODIMENTS

Figure 1:
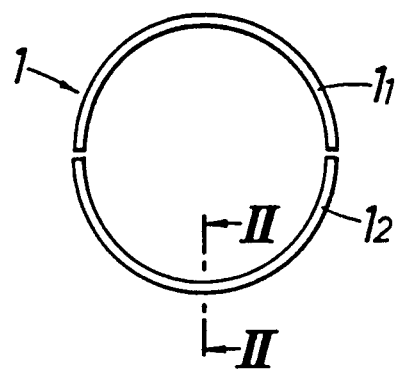
FIGS. 1 and 2 illustrate a slide bearing, FIG. 1 being an exploded plan view, and FIG. 2 being a sectional view taken along a line II—II in FIG. 1.
Figure 2:
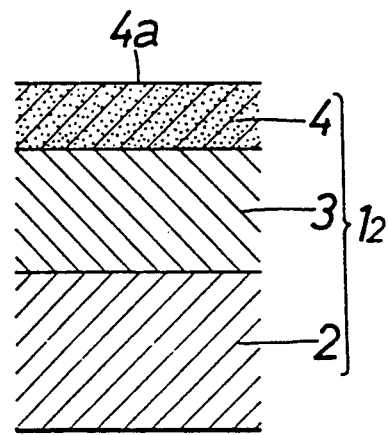

Referring to FIGS. 1 and 2, a slide bearing 1 as a slide member is applied to a journal portion of a crankshaft in an engine, an enlarged end of a connecting rod or the like and comprises a first half $1_1$ and a second half $1_2$. The halves $1_1$ and $1_2$ have the same structure and each includes a backing 2, a lining layer 3 formed on a slide surface of the backing 2 for a mating member, and a surface layer 4 formed on a surface of the lining layer 3. Optionally, a copper plating layer may be provided between the backing 2 and the lining layer 3, and a nickel plating barrier layer may be provided between the lining layer 3 and the surface layer 4.

The backing 2 is formed from a rolled steel plate and the thickness of the backing depends upon the set thickness of the slide bearing 1. The lining layer 3 is formed from copper, a copper-based alloy, aluminum, an aluminum-based alloy, etc., and the thickness of the lining layer is in a range of 50 to 500 μm and normally on the order of 300 μm. The surface layer 4 is formed from a Pb alloy, and the thickness of the surface layer is in a range of 5 to 50 μm and normally on the order of 20 μm.

The Pb alloy forming the surface layer 4 contains 80% (inclusive) to 90% (inclusive) by weight of Pb, and 3% (inclusive) to 20% (inclusive) by weight of Sn and if necessary, may contain at most 10% by weight of at least one element selected from the group consisting of Cu, In and Ag.

Cu has a function to increase the hardness of the surface layer 4, but if the Cu content exceeds 10% by weight, the resulting surface layer has an excessively high hardness, which will cause an increased amount of wear in a mating member. When Cu is added, it is desirable that the Cu content is adjusted such that the hardness Hmv of the resulting surface layer 4 is in a range of 17 to 20.

In and Ag have a function to soften the surface layer 4 to provide an improved initial conformability. However, if the content of In and/or Ag exceeds 10% by weight, the resulting surface layer 4 has a reduced strength. When In and/or Ag are added, it is desirable to adjust the content of In and/or Ag such that the hardness Hmv of the resulting surface layer 4 is in a range of 12 to 15.

The surface layer 4 is formed by an electro-plating process. The plating solution used is a borofluoride-based plating solution containing 40 to 180 g/l of $Pb^{2+}$ and 1.5 to 35 g/l of $Sn^{2+}$ and optionally, at most 15 g/l of $Cu^{2+}$. The temperature of the plating solution is set in a range of 10 to 35° C., and the cathode current density is set in a range of 2 to 15 $A/dm^2$.

Figure 3:
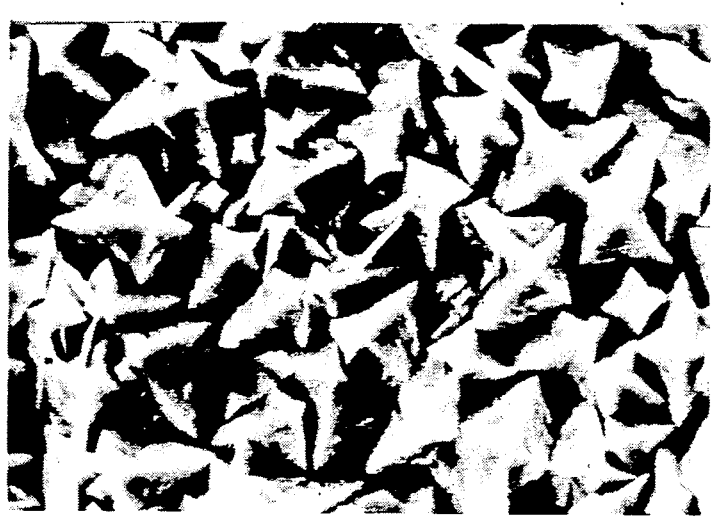
FIG. 3 is a photomicrograph showing a metallographic structure of a surface layer in accordance with the present invention.

FIG. 3 is an electronic photomicrograph (10,000 times) showing a metallographic structure on a slide surface 4a of the surface layer 4. The surface layer 4 was made of a Pb alloy containing 8% by weight of Sn and 2% by weight of Cu. The surface layer 4 was formed on a lining layer 3 made of a Cu alloy, and the cathode current density as set at 8 $A/dm^2$ in an electro-plating treatment in forming the surface layer 4.

The crystal of the Pb alloy in the slide surface 4a assumes a pyramid form with its apex directed to a meeting member with which the slide surface 4a, slides e.g., a quadrangular pyramid form in the illustrated embodiment, and four slanting surfaces thereof belong to surfaces parallel to a (111) plane by Miller indices.

Figure 4:
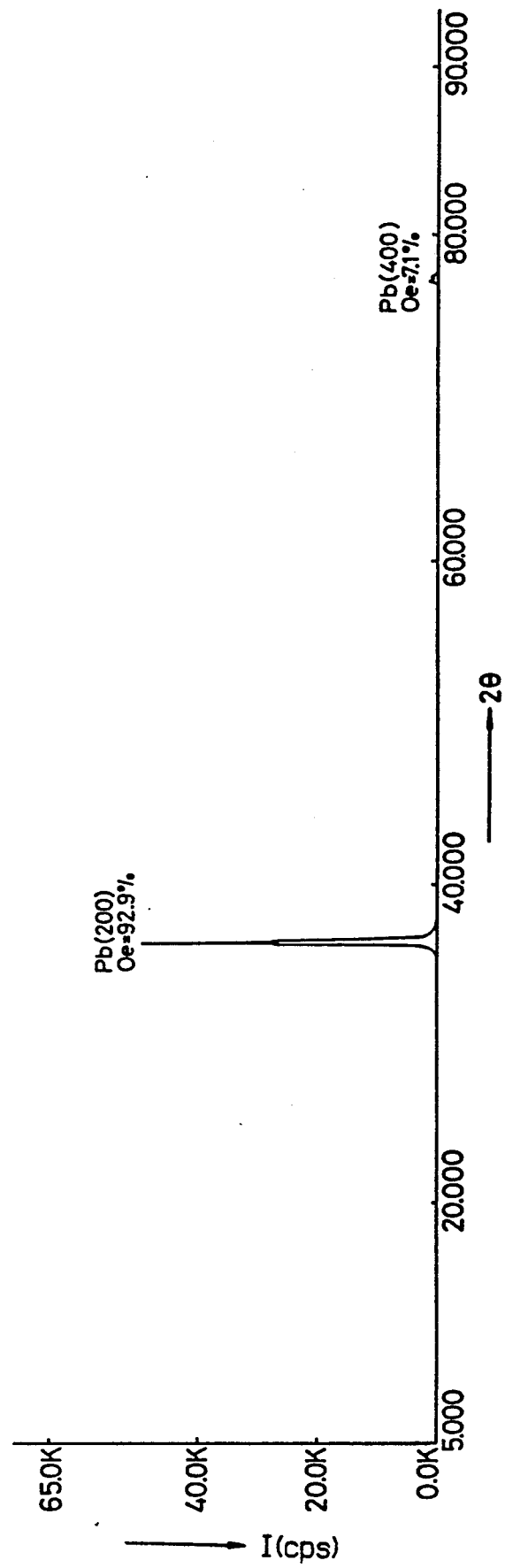
FIG. 4 is a pattern diagram of an X-ray diffraction for a Pb alloy forming the surface layer in accordance with the present invention.

FIG. 4 is a pattern diagram of an X-ray diffraction for the Pb alloy, wherein only diffraction peaks of planes with Miller indices of (200) and (400) are observed.

An orientation index Oe, which is index indicative of the orientation of the crystal face is defined as follows:

$$Oe = Ihkl / \Sigma Ihkl \times 100 \ (\%)$$

wherein hkl is the Miller indices of a plane, Ihkl is an integrated strength of a (hkl) plane; and ΣIhkl is a sum of Ihkl. The nearer to 100% the orientation index in a certain (hkl) plane is, the more the crystal faces oriented in a direction perpendicular to the (hkl) plane.

The integrated strength Ihkl and the orientation index Oe in the (200) and (400) planes of the Pb alloy are as given in Table 1 below.

TABLE 1

| hkl | Integrated strength Ihkl | Orientation index Oe (%) |
|---|---|---|
| 200 | 631,414 | 92.9 |
| 400 | 48,582 | 7.1 |

As apparent from Table 1, the orientation index in the (h00) plane of the Pb alloy is of 100% and hence, the Pb alloy has crystal faces oriented in axial directions in crystal axes a, b and c, i.e., (h00) planes.

Figure 5:
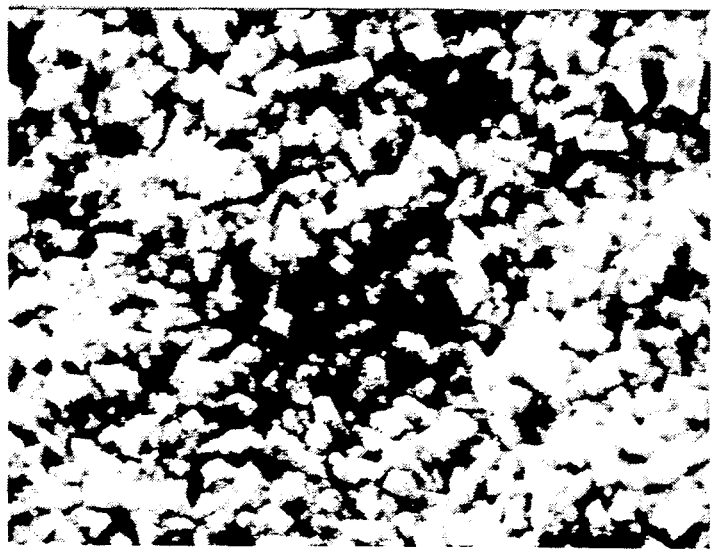
FIG. 5 is a photomicrograph showing a metallographic structure of a surface layer of the prior art.

FIG. 5 is an electronic photomicrograph (10,000 times) showing a metallographic structure in a slide surface of a prior art surface layer. The surface layer is made of a Pb alloy containing 8% by weight of Sn and 2% by weight of Cu. The surface layer is formed on a lining layer of a Cu alloy by an electro-plating treatment and may be applied to a journal portion of a crankshaft for an engine.

Figure 6:
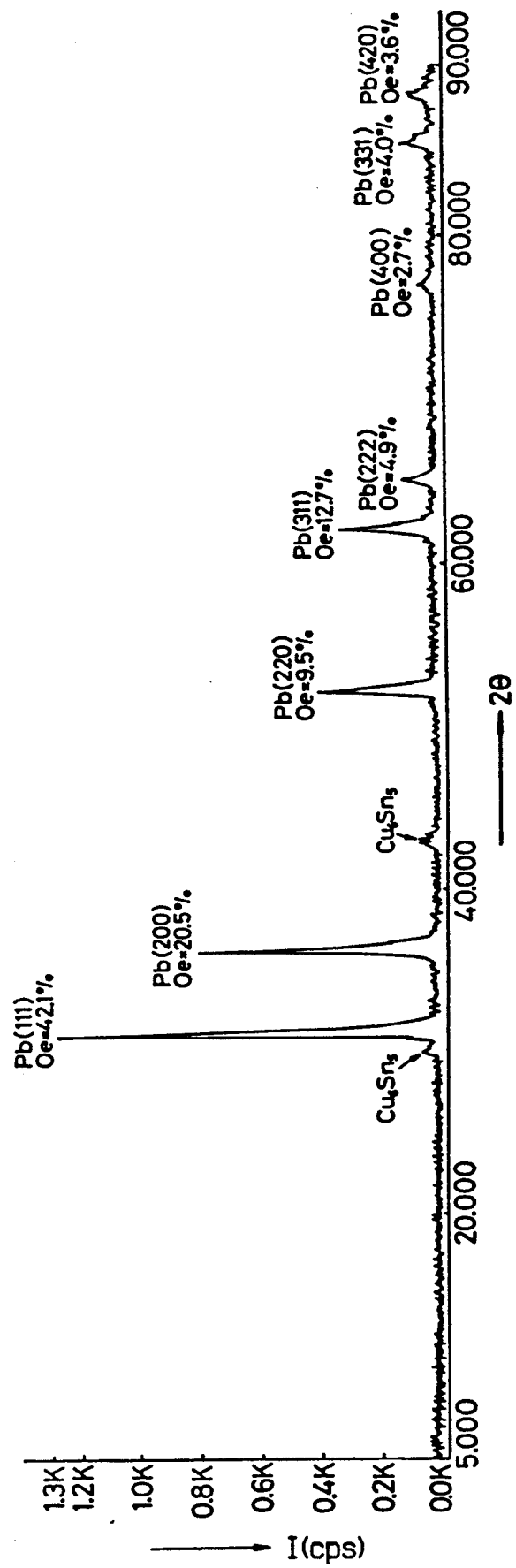
FIG. 6 is a pattern diagram of an X-ray diffraction for a Pb alloy forming the surface layer of the prior art.

FIG. 6 is a pattern diagram of an X-ray diffraction for a prior art Pb alloy. In FIG. 6, the orientation to a specific crystal face is not observed. The integrated strength Ihkl and the orientation index Oe in various (hkl) planes are as given in Table II below.

TABLE II

| hkl | Integrated strength Ihkl | Orientation index Oe (%) |
|---|---|---|
| 111 | 31,987 | 42.1 |
| 200 | 15,548 | 20.5 |
| 220 | 7,233 | 9.5 |
| 311 | 9,609 | 12.7 |
| 222 | 3,730 | 4.9 |
| 400 | 2,083 | 2.7 |
| 331 | 3,038 | 4.0 |
| 420 | 2,723 | 3.6 |

As apparent from FIG. 5 and Table II, the crystal form of the prior art Pb alloy is a form with crystal faces oriented at random and hence, the geometric shape of the crystal in the slide surface is an indetermined shape including a pyramid form partially.

Table III compares the composition and the orientation, and therefore the orientation index, of the surface layer of various slide bearings.

TABLE III

| | Chemical Constituent (% by weight) | | | | Orientation index Oe (%) | | | | | Thickness (μm) | Current density of cathode (A/dm²) |
|---|---|---|---|---|---|---|---|---|---|---|---|
| | Sn | Cu | In | Pb | (h00) | (111) (222) | (220) | (311) | (another) | | |
| Examples of the present invention | | | | | | | | | | | |
| I | 8 | 2 | — | Balance | 100 | — — | — | — | — | 20 | 8 |
| II | 8 | 2 | — | Balance | 60 | 28.5 | 4.2 | 1.1 | 6.2 | 20 | 3 |

TABLE III-continued

| | Chemical Constituent (% by weight) | | | | Orientation index Oe (%) | | | | | Thickness ($\mu$m) | Current density of cathode (A/dm$^2$) |
|---|---|---|---|---|---|---|---|---|---|---|---|
| | Sn | Cu | In | Pb | (h00) | (111) (222) | (220) | (311) | (another) | | |
| III | 8 | 2 | — | Balance | 80.1 | 13.8 | 1.3 | 1.2 | 3.6 | 20 | 4 |
| IV | 7.5 | — | 5.5 | Balance | 100 | — | — | — | — | 20 | 10 |
| V | 7.5 | — | 5.5 | Balance | 80 | 14.2 | 1.5 | 1.5 | 2.8 | 20 | 6 |
| VI | 7.5 | — | 5.5 | Balance | 50 | 36.3 | 3.6 | 3.6 | 6.5 | 20 | 2 |
| Comparative examples | | | | | | | | | | | |
| VII | 8 | 2 | — | Balance | 23.2 | 47 | 9.5 | 12.7 | 7.6 | 20 | — |
| VIII | 7.5 | — | 5.5 | Balance | 14.6 | 28.6 | 28.8 | 16.9 | 11.1 | 20 | — |

The example I of the present invention corresponds to the Pb alloy (FIG. 3) in the above-described embodiment of the present invention.

The examples II and III of the present invention have decreased cathode current density values, as compared with the example I and hence, have correspondingly reduced orientation indexs Oe in the (h00) plane.

The example IV of the present invention includes a surface layer formed from a Pb-Sn-In based alloy and has an orientation index of 100% in the (h00) plane.

The examples V and VI of the present invention have an increased current density of a cathode as compared with the example IV and hence, have correspondingly reduced orientation indices Oe in the (h00) plane.

The comparative example VII corresponds to the conventional Pb alloy (FIG. 5), and the cathode current density thereof cannot be determined.

The comparative example VIII has the same composition as the examples IV to VI of the present invention, but the cathode current density thereof cannot be determined.

Figure 7:
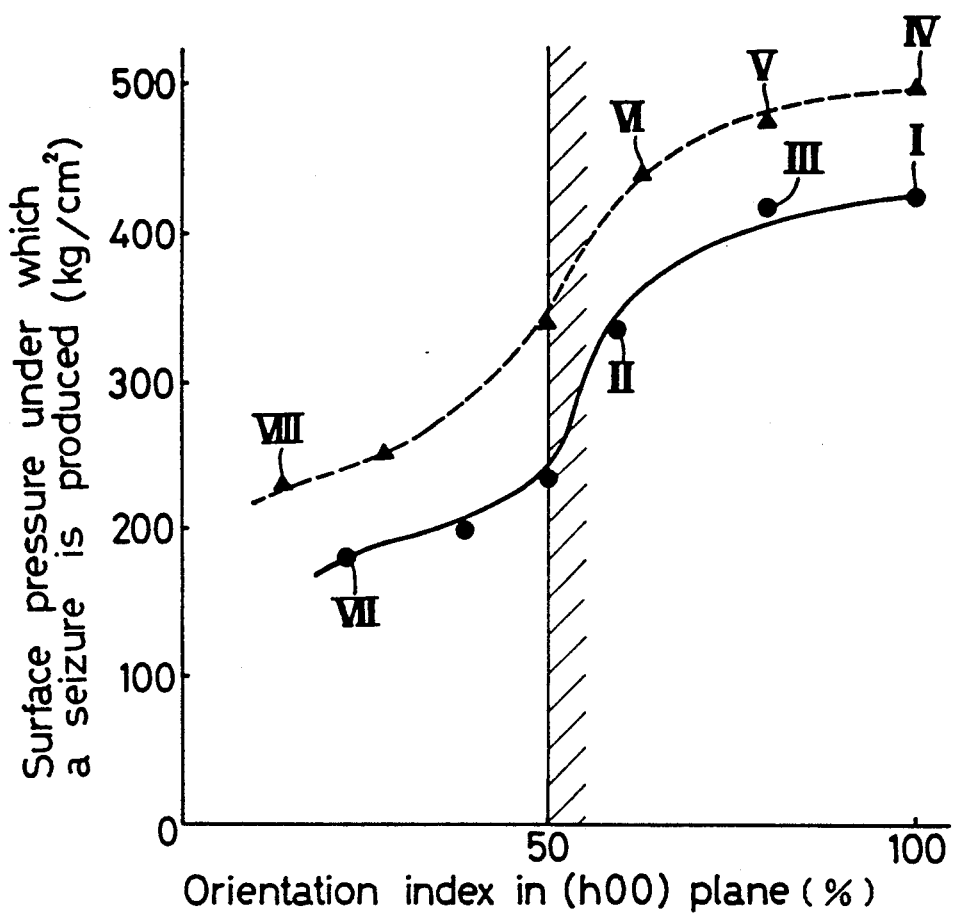
FIG. 7 is a graph illustrating a relationship between the orientation index in a (h00) plane and the surface pressure under which seizure is produced.

FIG. 7 illustrates the results of a seizure test conducted for the examples I to VI of the present invention and the comparative examples VII and VIII.

The seizure test was carried out by bringing each of the slide bearings into slide contact with a rotary shaft and gradually increasing the load applied to the slide bearing, and FIG. 7 is a graph illustrating surface pressures determined when a seizure was produced in the surface layer of each slide bearing.

The test conditions are as follows: The material used for the rotary shaft was a nitrided JIS S48C material, and the number of revolutions of the rotary shaft was 6,000 rpm; the oil supply temperature was 120° C.; the oil supply an oil supply pressure was 3 kg/cm$^2$; and the applied load was of 1 kg/sec.

As apparent from FIG. 7, the examples I to III and IV and VI of the present invention are excellent in seizure resistance as compared with the comparative examples VII and VIII.

This is attributable to the crystal form of the Pb alloy in the surface layer. More specifically, this is because in examples I to VI of the present invention, the crystal form of the Pb alloy is such that the orientation index Oe in the (h00) plane is at least 50%, but in the comparative examples VII and VIII, the crystal form of the Pb alloy is such that its crystal faces are oriented at random.

In order to increase the seizure resistance of the surface layer 4, the orientation index Oe in the (h00) plane is set in a range of 50 to 100% as described above and preferably at least at 60%. Especially, when requiring seizure resistance under a severe condition, the orientation index Oe in the (h00) plane is set at a minimum of 97%.

Figure 8:
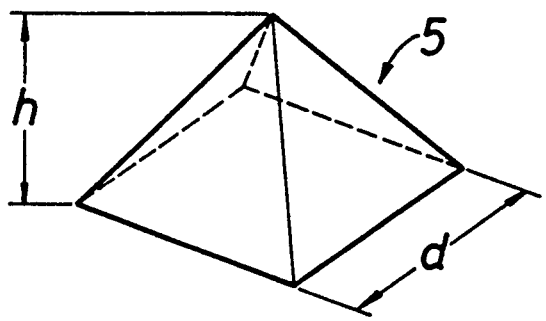
FIG. 8 is a perspective view of a quadrangular pyramid.

As shown in FIG. 8, in a quadrangular pyramid 5 made of a Pb alloy, the length d of the base is set at 8 $\mu$m or more, preferably in a range of 0.5 to 6 $\mu$m. The ratio h/d of the height h to the length d of the base of the quadrangular pyramid 5 is set in a range of 0.2 to 1.0, preferably 0.33 to 0.8. The size of such a pyramid depends upon the cathode current display. As the cathode current density is increased, the pyramid 5 grows larger.

The oil retension characteristic of the surface layer 4 can be improved by setting the form, geometric shape and size of the crystal of the Pb alloy in the above-described manner.

Table IV compares the composition; crystal orientation, and therefore the orientation index Oe of the (h00) plane; geometric shape and size of the surface layer of various slide bearings.

TABLE IV

| | Chemical Constituent (% by weight) | | | Oe (%) in (h00) plane | Crystal | | | | Thickness ($\mu$m) | Current density of cathode (A/dm$^2$) |
|---|---|---|---|---|---|---|---|---|---|---|
| | | | | | Geometric shape | size ($\mu$m) | | | | |
| | Sn | Cu | Pb | | | d | h | h/d | | |
| Examples of the present invention | | | | | | | | | | |
| IX | 8 | 2 | Balance | 100 | QA. pyramid | 2.2 | 1.0 | 0.45 | 20 | 6 |
| X | 8 | 2 | Balance | 100 | QA. pyramid | 2.4 | 1.5 | 0.63 | 20 | 8 |
| XI | 8 | 2 | Balance | 100 | QA. pyramid | 2.7 | 2.0 | 0.74 | 20 | 10 |
| XII | 10.5 | 2.5 | Balance | 100 | QA. pyramid | 0.85 | 0.7 | 0.82 | 20 | 3 |
| Comparative examples | | | | | | | | | | |
| XIII | 8 | 2 | Balance | 23.2 | Indetermined shape | 0.5 | — | — | 20 | — |
| XIV | 10.5 | 2.5 | Balance | 50.2 | Indetermined shape | 0.5 | — | — | 20 | — |

The example IX of the present invention corresponds to a Pb alloy similar to the example shown in FIG. 3 (except for the to cathode current density of 6A/dm$^2$.

Examples X and XI of the present invention correspond to Pb alloys with an increased cathode current density as compared with the example IX of the present invention, and the example XII of the present invention corresponds to a Pb alloy with a reduced cathode current density as compared with the example IX of the present invention.

Comparative example XIII corresponds to a Pb alloy similar to the example shown in FIG. 5, the geometric shape of the crystal thereof is an unstable shape, which includes a partial amount of quadrangular pyramids, but the cathode current density thereof cannot be determined.

In comparative example XIV, the composition thereof is substantially the same as that of example XII of the present invention. The geometric shape of the crystal, however, is substantially the same as that of comparative example XIII, but the cathode current density cannot be determined.

Figure 9:
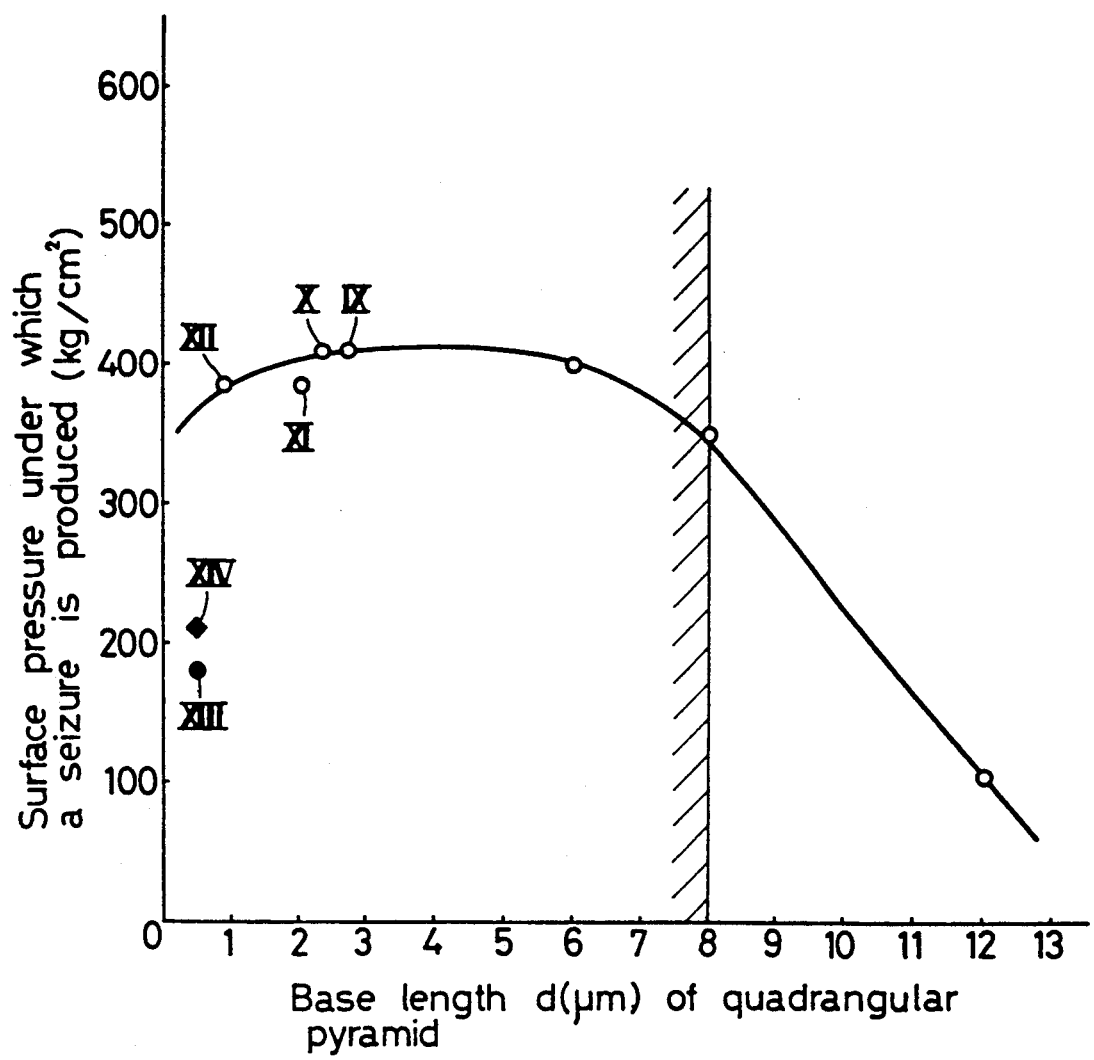
FIG. 9 is a graph illustrating a relationship between the base length d of the quadrangular pyramid and the surface pressure under which a seizure is produced.
Figure 10:
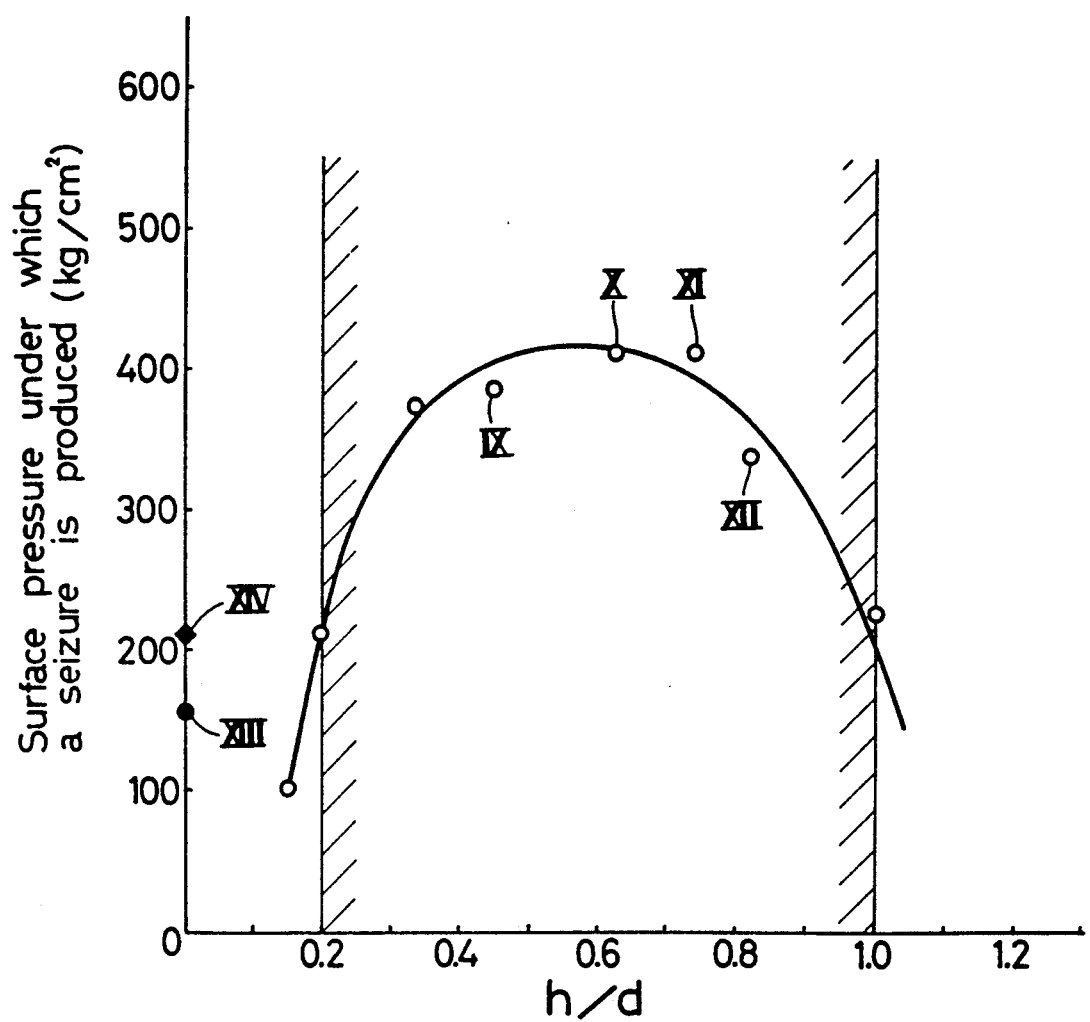
FIG. 10 is a graph illustrating a relationship between the ratio h/d and the surface pressure under which seizure is produced.

FIGS. 9 and 10 illustrate the results of seizure tests conducted for examples IX to XII of the present invention and comparative examples XIII and XIV. FIG. 9 illustrates a relationship of seizure with respect to the length d of the base of the quadrangular pyramid, and FIG. 10 illustrates a relationship of seizure with respect to the length d and height h, i.e., to the ratio of h/d. The procedure and the conditions of the seizure tests are the same as those shown in FIG. 7.

As apparent from FIGS. 9 and 10, in the examples IX and XII of the present invention, the oil retension characteristics can be increased to provide an excellent seizure resistance as compared with those of the example XIII and XIV by making the crystal of the Pb alloy forming the slide surface 4a of the surface layer 4 as quadrangular pyramids 5 and setting the length of the base of each pyramid at 8 μm or less, preferably in a range of 0.5 to 6 μm and setting the ratio h/d of the height h to the base length d in a range of 0.2 to 1.0, preferably 0.33 to 0.8.

Table V compares the composition and crystal orientation, i.e., the orientation index Oe and the like, of the surface layer of various slide bearings.

ness of the example XVI is increased as compared with the example XV of the present invention.

Example XVII of the present invention corresponds to a Pb-Sn-In alloy formed by plating a Pb-Sn alloy on a lining layer of a Cu alloy, plating In thereon and thermal diffusion. The temperature of the subjecting it to thermal diffusion treatment was of 150° C., and the period of time thereof was of one hour.

Example XVIII of the present invention corresponds to a Pb alloy similar to the example shown in FIG. 8.

Comparative example XIX has the same composition as the example XVII of the present invention.

Comparative example XX has no surface layer and includes a slide surface provided by a lining layer made of an aluminum alloy. The aluminum alloy contains 1.7% by weight of Pb, 12% by weight of Sn, 0.7% by weight of Cu, 0.3% by weight of Sb, and 2.5% by weight of Si.

Figure 11:
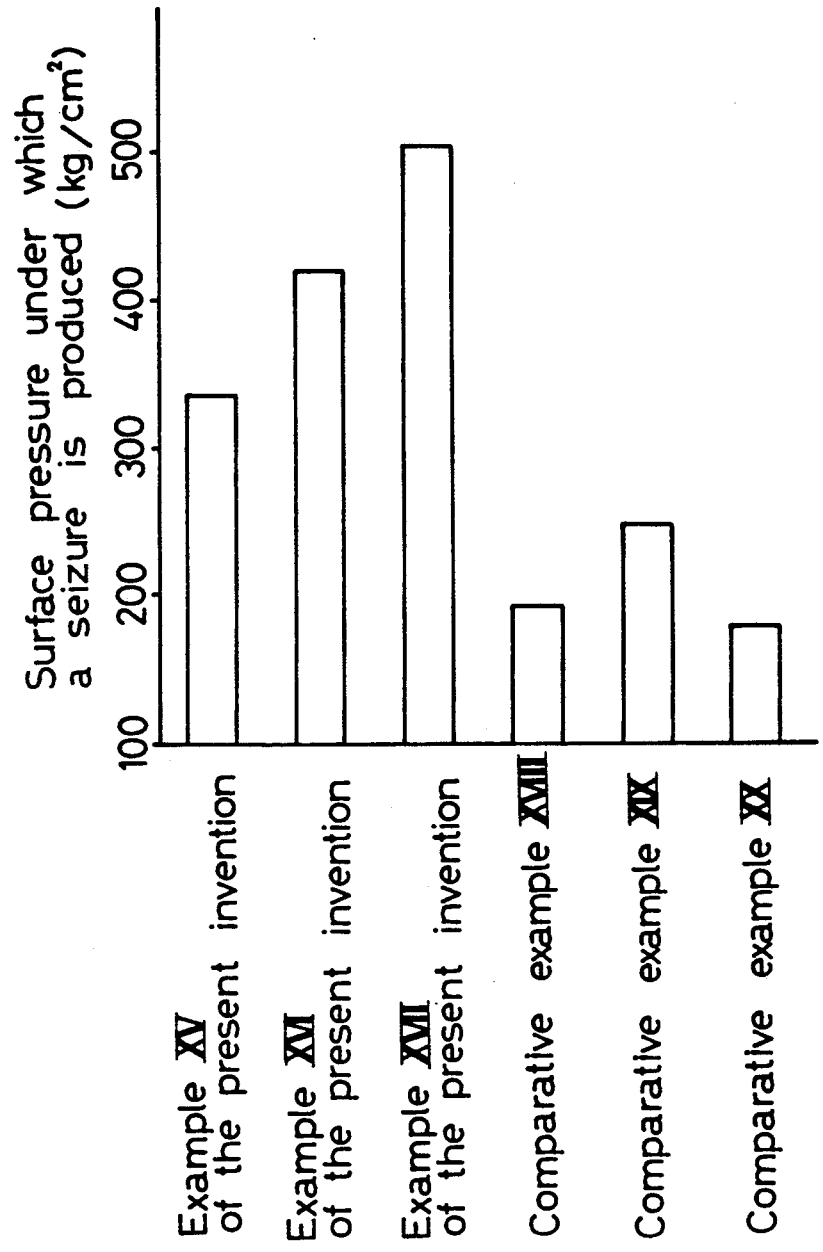
FIG. 11 is a graph illustrating the results of seizure tests.

FIG. 11 illustrates the results of seizure tests for a examples XV to XVII of the present invention and comparative examples XVIII to XX. The procedure and conditions of the tests are the same as those in FIG. 7.

As apparent from FIG. 11, the examples XV to XVII of the present invention are excellent in seizure resistance as compared with the comparative examples XVIII and XIX.

This is attributable to the composition and the crystal form of the Pb alloy in the surface layer. More specifically, this is because in the examples XV to XVII of the present invention, the Pb alloy contains 3% (inclusive) to 20% (inclusive) by weight of Sn and at most 10% by weight of at least one element selected from the group consisting of Cu, In and Ag and at the same time, the crystal form of the Pb alloy has an orientation index of 100% in the (h00) plane and has crystal faces oriented in a single direction. By contrast, in the comparative examples XVIII and XIX, the composition is the same as the examples of the present invention, but the crystal form of their Pb alloy has crystal faces oriented at random, and for this reason, the seizure resistance of comparative examples XVIII and XIX is inferior.

Figure 12:
FIG. 12 is a photomicrograph showing a metallographic structure of another surface layer in accordance with the present invention.

FIG. 12 illustrates another example of a surface layer in the present invention. The composition of the Pb alloy thereof is the same as the example XV of the

TABLE V

| | Chemical Constituent (% by weight) | | | | Orientation index Oe (%) | | | | Thickness (μm) | Hardness (Hmv) |
|---|---|---|---|---|---|---|---|---|---|---|
| | Sn | Cu | In | Pb | (h00) | (111) | (220) | (another) | | |
| Examples of the present invention | | | | | | | | | | |
| XV | 8 | 2 | — | Balance | 100 | — | — | — | 20 | 18 |
| XVI | 8.5 | 1.5 | — | Balance | 100 | — | — | — | 20 | 19 |
| XVII | 7.5 | — | 5.5 | Balance | 100 | — | — | — | 20 | 14 |
| Comparative examples | | | | | | | | | | |
| XVIII | 8 | 2 | — | Balance | 23.2 | 42.1 | 9.5 | 25.2 | 20 | 15.5 |
| XIX | 7.5 | — | 5.5 | Balance | 14.6 | 26.7 | 28.8 | 29.9 | 20 | 11 |
| XX | — | — | — | — | — | — | — | — | — | — |

The example XV of the present invention corresponds to a Pb alloy similar to the example shown in FIG. 3 (except that the cathode current density is 8 A/dm$^2$).

The example XVI of the present invention, the cathode current density was changed to 10 A/dm$^2$ as compared with the example XV and therefore differs from the latter in composition of the surface layer. The hardpresent invention, but the cathode current density is set at 10 A/dm$^2$ which is higher than that of the example XV of the present invention.

The magnification of this electronic microphotography is 10,000 times, which is the same as that of FIG. 3, but it can be seen that attendant upon an increase in cathode current density, quadrangular pyramids grew largely than those of FIG. 3.

The crystal orientation of this Pb alloy is such that the orientation index Oe is 97.5% in the (h00) plane and 1.3% in the (111) plane, and in the crystal form thereof crystal faces are oriented in a substantially single direction.

It should be noted that when Ag is incorporated into the surface layer, a method is employed in which an electroplating treatment is conducted using a plating solution containing Pb and Sn ions with Ag ion added thereto. In addition, it will be understood that the present invention is not limited to the slide bearings and is applicable to other type of slide members.

What is claimed is:

1. A slide member comprising a surface layer of a Pb alloy on a slide surface for a mating member, wherein said Pb alloy comprises at least 3% and at most 20% by weight Sn, and said Pb alloy has a crystal form with an orientation index in a (h00) plane by Miller indices being set in a range of 80 to 100%.

2. A slide member according to claim 1, wherein said orientation index is greater than or equal to 97%.

3. A slide member comprising a surface layer of a Pb alloy on a slide surface for a mating member, wherein said Pb alloy comprises at least 3% and at most 20% by weight Sn, said Pb alloy has a crystal form with an orientation index in a (h00) plane by Miller indices being set in a range of 80 to 100%, and the crystals of said Pb alloy are formed into pyramids with the apex of each pyramid being directed to the mating member and each pyramid having a base length d of 8 $\mu$m or less.

4. A slide member according to claim 3, wherein the ratio h/d of the height h to the base length d of said pyramid is set in a range of 0.2 to 1.0.

5. A slide member according to claim 1, 2, 3, or 4, wherein said Pb alloy contains at most 10% by weight of at least one element selected from the group consisting of Cu, In and Ag.

6. A slide member according to claim 3, wherein said orientation index is greater than or equal to 97%.

7. A slide member according to claim 3, wherein said base length d is set in a range of 0.5 to 6 $\mu$m.

8. A slide member according to claim 4, wherein said ration h/d is set in a range of 0.33 to 0.8.

9. A slide member comprising a surface layer of a Pb alloy on a slide surface for a mating member, wherein the Pb alloy consists essentially of 80 to 90% by weight of Pb, 3 to 20% by weight of Sn, and 0 to 10% by weight of at least one element selected from the group consisting of Cu, In and Ag, and the Pb alloy has a crystal form with an orientation index in a (h00) plane by Miller indices in the range of 80 to 100%.

10. A slide member according to claim 9, wherein the orientation index is greater than or equal to 97%.

11. A slide member comprising a surface layer of a Pb alloy on a slide surface for a mating member, wherein the Pb alloy consists essentially of 80 to 90% by weight of Pb, 3 to 20% by weight of Sn, and 0 to 10% by weight of at least one element selected from the group consisting of Cu, In and Ag, and the Pb alloy has a crystal form with an orientation index in a (h00) plane by Miller indices in the range of 80 to 100%, and the crystals of the Pb alloy are formed into pyramids with the apex of each pyramid being directed to the mating member and each pyramid having a base length d of 8 $\mu$m or less.

12. A slide member according to claim 11, wherein the pyramid has such a height h that the ratio h/d of the height h to the base length d is in the range of 0.2 to 1.0.

13. A slide member according to claim 9, 10, 11 or 12, wherein the Pb alloy does not include any of Cu, In and Ag.

14. A slide member according to claim 9, 10, 11 or 12, wherein the Pb alloy includes at most 10% by weight of at least one element selected from the group consisting of Cu, In and Ag.

15. A slide member according to claim 11, wherein the orientation index is greater than or equal to 97%.

16. A slide member according to claim 11, wherein the base length d is set in a range of 0.5 to 6 $\mu$m.

17. A slide member according to claim 12, wherein the ratio h/d is set in a range of 0.33 to 0.8.

18. A slide member according to claim 9, 10, 11 or 12, wherein the Pb alloy includes Cu in such an amount that is up to 10% by weight and that the surface layer has a hardness Hmv of 17 to 20.

19. A slide member according to claim 9, 10, 11 or 12, wherein the Pb alloy includes at least one member of In and Ag in such a total amount that is up to 10% by weight and that the surface layer has a hardness Hmv of 12 to 15.

20. A slide bearing comprising:
an inner backing made of a rolled steel plate;
a medium lining made of copper, copper-based alloy, aluminum or aluminum-based alloy and being 50 to 500 $\mu$m thick, and
an outer surface layer being 5 to 50 $\mu$thick and being made of a Pb alloy on a slide surface of the lining layer,
wherein the Pb alloy consists essentially of 3 to 20% by weight of Sn, 80 to 90% weight of Pb and at least one element selected from the group consisting of Cu, In and Ag in a total amount of 0 to 10% by weight, and
the Pb alloy has a crystal form with an orientation index in a (h00) plane by Miller indices in the range of 80 to 100%.

21. A slide bearing according to claim 20, composed of two halves each having the same structure and each having the inner backing, the medium lining and the outer surface layer.

22. A slide bearing according to claim 20, wherein the Pb alloy is made of crystals in a pyramid form with the apex of the pyramid being directed to the slide surface of the lining layer and each pyramid having a base length d of 0.5 to 8 $\mu$m.

23. A slide bearing according to any one of claims 20 to 22 wherein the orientation index is 97 to 100%.

* * * * *